US 6,215,217 B1

(12) United States Patent
Kurosawa

(10) Patent No.: US 6,215,217 B1
(45) Date of Patent: Apr. 10, 2001

(54) DYNAMIC PRESSURE BEARING MOTOR

(75) Inventor: Hironori Kurosawa, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/477,550

(22) Filed: Jan. 4, 2000

(30) Foreign Application Priority Data

Jan. 6, 1999 (JP) .................................. 11-000777

(51) Int. Cl.$^7$ ............................. H02K 5/16; F16C 17/10
(52) U.S. Cl. .................. 310/90; 310/67 R; 384/107; 384/112; 384/113
(58) Field of Search ................. 310/90, 90.5, 67 R; 384/100, 107, 115, 113, 112, 114, 120; 29/596–598

(56) References Cited

U.S. PATENT DOCUMENTS

| | | | |
|---|---|---|---|
| 4,798,476 | * | 1/1989 | Sakatani et al. ................. 384/108 |
| 5,018,880 | * | 5/1991 | Nakasugi et al. ................ 384/112 |
| 6,064,130 | * | 5/2000 | Konno et al. ..................... 310/90 |

FOREIGN PATENT DOCUMENTS

| | | | |
|---|---|---|---|
| 64-3318 | 1/1989 | (JP) | ............................. F16C/17/10 |
| 8-196056 | 7/1996 | (JP) | ............................. H02K/7/08 |

* cited by examiner

Primary Examiner—Tran Nguyen
(74) Attorney, Agent, or Firm—Sughrue, Mion, Zinn, Macpeak & Seas, PLLC

(57) ABSTRACT

In a motor 5 in which a thrust bearing 8 using the magnetic force acting between a stator 40 side and a rotor 20 side and a radial bearing 7 using the dynamic pressure generated between the outer peripheral surface 440 of a fixed shaft 44 and the inner peripheral surface of the center hole 21 of the rotor 20 are formed between the stator 40 and the rotor 20, along the axial direction L of the motor shaft between the outer peripheral surface 440 of the fixed shaft 44 and the inner peripheral surface of the center hole 21 of the rotor 20, an annular clearance 70 for generating dynamic pressure between the outer peripheral surface 440 of the fixed shaft 44 and the inner peripheral surface of the center hole 21 of the rotor 20, an annular air chamber 92 for an air damper which communicates with this clearance, and an annular clearance 91 for the air damper which communicates the chamber with the external portion are formed in this order.

6 Claims, 3 Drawing Sheets

DYNAMIC PRESSURE BEARING MOTOR

BACKGROUND OF INVENTION

1. Field of Invention

The present invention relates to a high-speed motor such as a polygon mirror, a hard disc and, in particular, relates to a vibration attenuation technique for a motor in which a dynamic pressure bearing is used as a radial bearing.

2. Related Art

Of various kinds of motors, the motor disclosed in Japanese Patent Unexamined Publication No. Sho. 64-3318, for example, employs an air dynamic pressure bearing as a radial bearing so that a rotor is floated to the thrust direction by utilizing magnetic force generated between a magnet disposed on a rotor side and a magnet disposed on a stator side. Thus, since the rotor is in a completely non-contact state during the rotation thereof, the rotor can be rotated at a high speed. In such an arrangement, an annular air chamber for an air damper is formed between a fixed shaft and the rotor in a manner that the air chamber is communicated with the outside through a small hole (orifice). According to such an arrangement, the motor can be provided with an air damper by the small hole and the annular air chamber for an air damper, so that the vertical vibration of the rotor can be suppressed due to the resistance of the air when passing through the small hole.

Further, Japanese Patent Unexamined Publication No. Hei. A-8-196056 discloses a motor in which the effect similar to that of the aforesaid publication is obtained by forming grooves extending from an annular air chamber for an air damper to the outside with respect to a dynamic pressure portion in stead of a small hole forming the air damper.

In order to constitute such an air damper, a small hole or grooves serving as an orifice is required. However, in the case of forming such a hole by the drill processing like the prior art, the minimum diameter ø and length of the hole are limited to about 0.4 mm and 5 mm, respectively, even if it is desired to made them smaller. Further, in the case of combining a member having been subjected to such a hole making process with another member by means of a screw etc. thereby to form an annular air chamber for an air damper, there arises a case that the annular air chamber for an air damper communicates with the outside through the combined surface and the chamber does not serve as a damper. Furthermore, as the motor is further miniaturized, it is required to make the resistance of the flow path of the orifice of the air damper larger. Thus, although a narrow long hole is required as the orifice, it is difficult to form such a small and narrow hole by the normal boring process.

In the case of forming the groove at the dynamic pressure generating portion, there arises a problem that the rigidity of a dynamic pressure bearing is degraded.

SUMMARY OF INVENTION

In view of the aforesaid problem of the prior art, an object of the present invention is to provide a motor with a built-in air damper which can freely set a damping factor of vertical vibration of a rotor with a small number of parts and without performing a complicated and troublesome processing.

According to an aspect of the present invention, there is provided a dynamic pressure bearing motor comprising:

a stator having a stator core around which a driving coil is wound and a fixed shaft;

a rotor having a center hole in which said fixed shaft is inserted and a rotor magnet opposing to said stator core;

thrust bearing means, provided at each of said rotor and said stator, for supporting said rotor to thrust direction by magnetic force acting mutually therebetween;

radial bearing means for supporting said rotor to radial direction by dynamic pressure generated between outer peripheral surface of said fixed shaft and inner peripheral surface of said center hole;

a dynamic pressure generation portion defined by said radial bearing means and generates the dynamic pressure between said outer peripheral surface of said fixed shaft and said inner peripheral surface of said center hole;

an annular air chamber for an air damper communicating with said dynamic pressure generation portion; and an annular clearance for communicating said annular air chamber for an air damper with external air, wherein said dynamic pressure generation portion, said annular air chamber for an air damper and said annular clearance for the air damper are disposed in this order along axial direction of said rotor.

As described above, according to the motor of the present invention, when the rotor rotates, the stator 40 and the rotor 20 are placed in the non-contact state to each other by the dynamic pressure generated at the dynamic pressure generation portion. Further, when the motor starts rotating, the rotor is held at the magnetically balanced position in the thrust bearing. In this state, since the stator and the rotor are placed in the completely non-contact state to each other, the rotor can be rotated at a high speed and the life time of the motor can be elongated. Since the rigidity of the thrust bearing utilizing the magnetic force is relatively small, the rotor vibrates vertically due to the external force etc. applied thereto. However, in the present invention, when the rotor vibrates vertically due to the disturbance along the axial direction of the motor shaft applied thereto, the exhausting and entering of the air through the narrow annular clearance for the air damper between the external and the annular chamber for the air damper generates the friction of the air. As a result, the vibration energy of the rotor along the vertical direction is absorbed by the friction, so that the vibration of the rotor can be suppressed. Further, according to the damper formed in the motor of this embodiment, the size of the space and the length along the axial direction of the motor shaft of the annular clearance for the air damper can be designed freely depending on how the outer peripheral surface of the fixed shaft and the inner peripheral surface of the center hole of the rotor are shaped. Accordingly, it is possible to constitute the motor having desired damping factor of the vibration of the rotor along the vertical direction.

DETAILED DESCRIPTION OF PREFERRED EMBODIMENTS

Embodiments of the present invention will be described with reference to the accompanying drawings.

Figure 1:
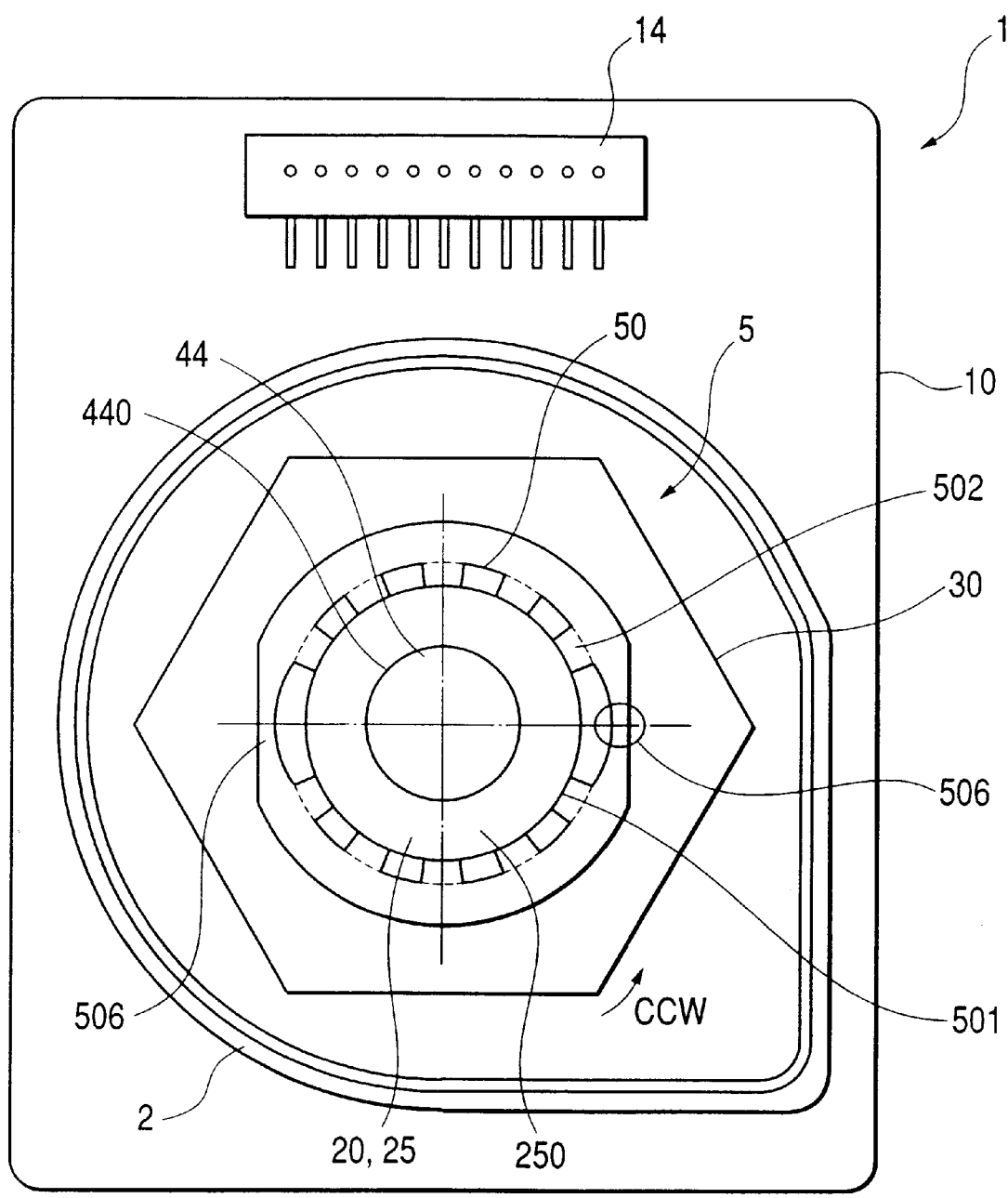
FIG. 1 is a plan view of a polygon mirror driving apparatus using a motor to which the present invention is applied.
Figure 2:
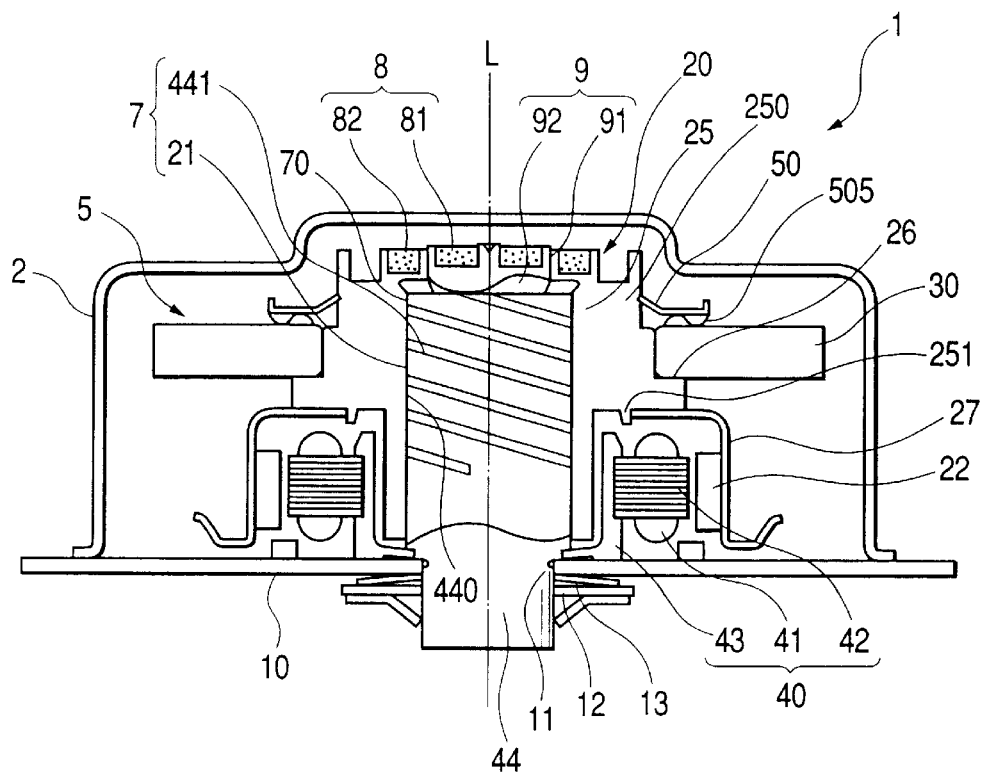
FIG. 2 is a sectional view of the polygon mirror driving apparatus shown in FIG. 1.
Figure 3:
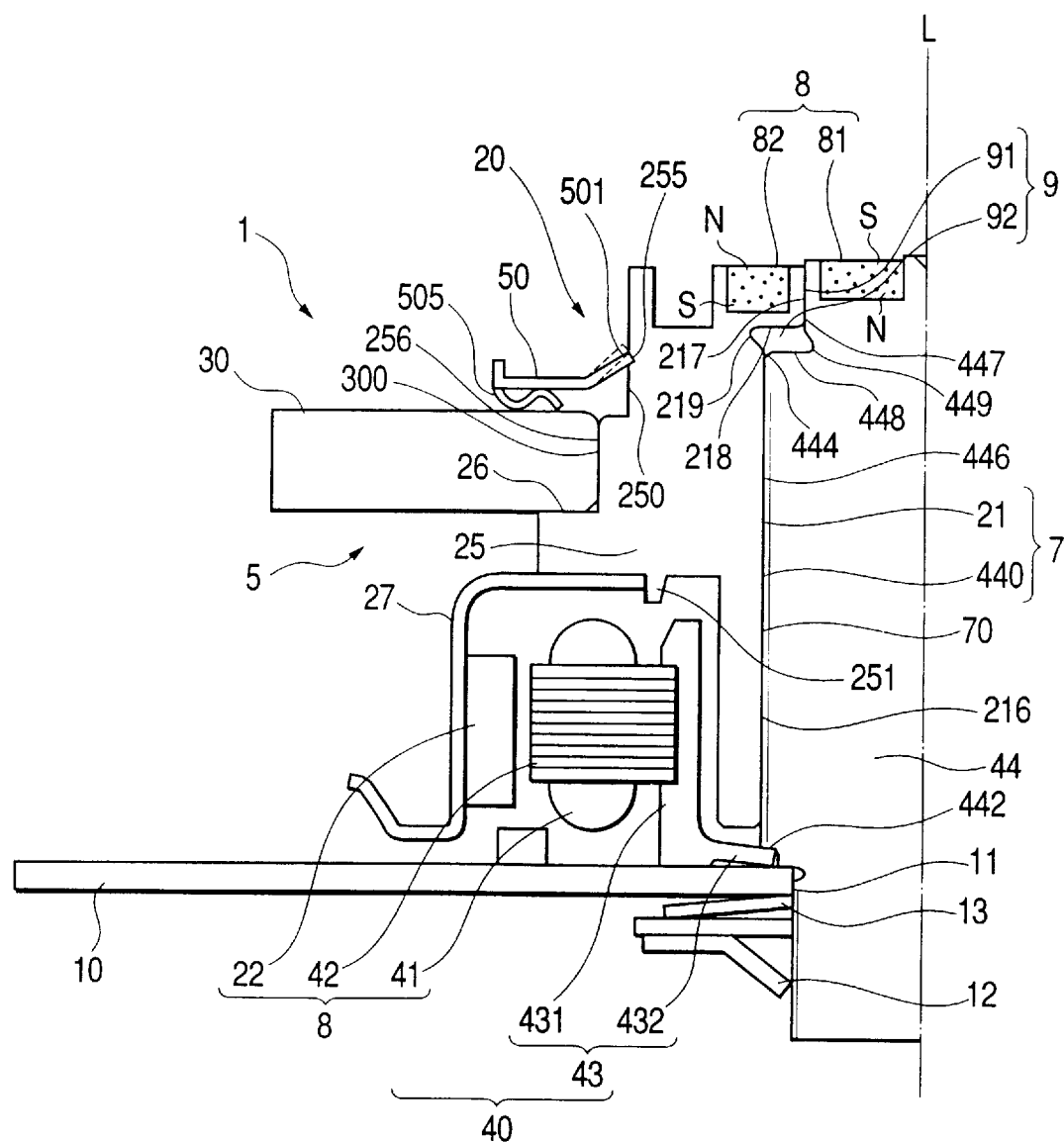
FIG. 3 is a semi-sectional diagram showing the configuration of the rotor and the fixed shaft used in the polygon mirror driving apparatus shown in FIG. 1.

FIG. 1 is a plan view of a polygon mirror driving apparatus using a motor to which the present invention is applied and FIG. 2 is a sectional view thereof. FIG. 3 is an enlarged semi-sectional diagram showing the motor used in the polygon mirror driving apparatus.

Entire Configuration

In FIGS. 1 and 2, the polygon mirror driving apparatus 1 is generally formed by a motor 5 configured on a substrate 10 made of iron, a polygon mirror 30 mounted on the rotor 20 of the motor 5, and a casing 2 covering the entirety of the motor 5 and the polygon mirror 30. The casing 2 is a dustproof and soundproof cover. A connector 14 for outputting a driving signal to a driving coil 41 is mounted on the substrate 10 by means of solder or the like.

In FIG. 3, the motor 5 is provided with a stator core 42 around which the driving coil 41 is wound, a stator 40 having a fixed shaft 44, and the rotor 20 having a center hole 21 into which the fixed shaft 44 is inserted and a rotor magnet 22 opposing to the stator core 42.

Configuration of Stator

In this embodiment, the stator 40 is arranged in a manner that the base end side of the fixed shaft 44 is fitted into a shaft fixing hole 11 formed at the substrate 10 made of iron and the fixed shaft 44 is vertically fixed to the substrate 10 by means of a push nut 12. A coned disc spring 13 is sandwiched between the substrate 10 and the push nut 12 so that the push nut 12 fixes the substrate 10 and the fixed shaft 44 through the coned disc spring 13. Thus, since the vibration of the fixed shaft 44 is absorbed by the coned disc spring 13, there does not arise such a problem that the push nut 12 is loosened.

The stator 40 is arranged in a manner that a core holder 43 is fixed on the substrate 10, a thin stator core 42 is fixed to the outer peripheral surface of the core holder 43 in a laminated state, and the driving coil 41 is wound around each of the salient poles of the stator core 42. The core holder 43 includes a cylindrical portion 431 whose outer peripheral surface serves as a portion to which the stator core 42 is attached, and an annular fixing portion 432 which is sandwiched between the fixing step portion 442 of the fixed shaft 44 and the substrate 10 when the core holder 43 is placed on the substrate 10 in a manner that the lower end surface of the cylindrical portion 431 is made in contact with the substrate 10. When the fixed shaft 44 is fixed to the substrate 10 through the push nut 12 and the coned disc spring 13, the annular fixing portion 432 of the core holder 43 is sandwiched between the fixing step portion 442 of the fixed shaft 44 and the substrate 10, so that the core holder 43 is fixed on the substrate 10.

Configuration of Rotor

In this embodiment, the rotor 20 includes a rotor main body 25 having the center hole 21, a yoke 27 fixed to the lower surface side of the rotor main body 25 so as to extend to the outer peripheral side from the rotor main body 25 and the rotor magnet 22 fixed to the inner peripheral surface of the yoke 27. The rotor magnet 22 is fixed to the yoke 27 by adhesive and then fixed to annular projections 251 formed at the lower end surface of the rotor main body 25 by the caulking process. The rotor main body 25 may be subjected to the surface processing such as the alumite processing, the plating processing or the like in order to improve the abrasion resistance and the corrosion resistance of the rotor main body. Further, in this embodiment, when the degree of the unbalance state of the rotor is too high at the time of forming the rotor 20, the balance state of the rotor 20 can be improved by attaching a weight or the like to the annular projections 251.

A pedestal portion 26 for mounting the polygon mirror 30 is formed at the outer peripheral side of the rotor main body 25. The polygon mirror 30 mounted on the pedestal portion 26 is pressed against the pedestal portion 26 and fixed thereto by a ring-shaped mirror pressing member 50. The mirror pressing member 50 has a center hole 501 through which the cylindrical portion 250 of the rotor main body 25 is passed. In this state, a plurality of nail portions 502 extending at the inside of the center hole 501 engage with engagement grooves 255 formed at the outer peripheral surface of the cylindrical portion 250 while being elastically deformed, so that the mirror pressing member 50 is fixed to the rotor main body 25. In this case, the polygon mirror 30 is in a state that the cylindrical portion 256 of the rotor main body 25 is passed through the center hole 300 of the polygon mirror. A predetermined clearance is secured between the center hole 300 and the cylindrical portion 256 of the rotor main body 25 so as to prevent the occurrence of such a phenomenon that, when passing the cylindrical portion 256 of the rotor main body 25 through the center hole 300 of the polygon mirror 30, an excessive force is applied to the polygon mirror 30 thereby to deform the polygon mirror 30. Thus, the mirror pressing member 50 elastically presses the polygon mirror 30 against the pedestal portion 26 and fixes to the pedestal portion by means of a spring 505 provided at the mirror pressing member (or a spring 505 provided separately from the mirror pressing member between the mirror pressing member and the polygon mirror 30). Accordingly, the polygon mirror 30 is placed in a state that the polygon mirror is positioned and fixed to the pedestal portion by the friction force between the polygon mirror and the upper surface f the pedestal portion 26.

Thus, when the rotor 20 rotates, since there is a difference between centrifugal force applied to the rotor 20 and that applied to the polygon mirror 30 due to the difference in the outer diameters between the rotor 20 and the polygon mirror 30, these members independently expand due to the centrifugal forces applied thereto in a manner that the expansion degree of these members differ to each other. As a result, as the motor 5 repeats the start and stop operations, the polygon mirror 30 may be shifted or displaced on the pedestal portion 26 of the rotor 20. In contrast, the mirror pressing member 50 is completely fixed to the fixed shaft 44 and not deformed by the centrifugal force applied thereto. Thus, in the embodiment, the friction force generated between the mirror pressing member 50 and the polygon mirror 30 is set to be larger than that generated between the polygon mirror 30 and the pedestal portion 26 of the rotor 20. For example, of the surface of the rotor 20, at least the pedestal portion 26 of the rotor 20 is subjected to the alumite processing, the plating processing, the nitriding processing, and the coating processing thereby to make the friction force generated between the polygon mirror 30 and the pedestal portion 26 of the rotor 20 small. In contrast, the mirror pressing member 50 is made of aluminum like the polygon mirror 30 thereby to make the friction force generated between the mirror pressing member 50 and the polygon mirror 30 large. Accordingly, even if the motor 5 repeats the start and stop operations, since the polygon mirror 30 is always positioned by the mirror pressing member 50, such a phenomenon can be prevented from occurring that the polygon mirror 30 may be shifted or displaced on the pedestal portion 26 of the rotor 20 and so the polygon mirror 30 vibrates.

Alternatively, if the mirror pressing member 50 and the polygon mirror 30 are fixed to each other by adhesive, the polygon mirror 30 can also be prevented from being shifted or displaced on the pedestal portion 26 of the rotor 20.

In this embodiment, as shown in FIG. 1, the mirror pressing member 50 is configured in a ring shape with a predetermined width. Further, although the mirror pressing member 50 is configured in an annular shape as a whole, each of two portions thereof disposed symmetrically with respect to the center hole 501 through which the cylindrical portion 250 is passed has such a configuration that the outer peripheral side thereof is cut straightly. Such a cut portion serves as the cut estimation portion 506 having a narrow width about half of that of the remaining portion. That is, even if a person desires to remove the polygon mirror 30 after the polygon mirror 30 is pushed against and fixed on the rotor 20 by means of the mirror pressing member 50, the person can not easily remove the polygon mirror since the mirror pressing member 50 is fitted into the engagement grooves 255. However, in this embodiment, since the mirror pressing portion 50 is provided with the cut estimation portions 506 with the smaller width in advance and the portion 50 has the spring 505 between the mirror pressing portion and the polygon mirror 30, the mirror pressing portion is floated from the upper end surface of the polygon mirror 30 by the length corresponding to the spring. Thus, if a nipper (not shown) is inserted into the cut estimation portion 506, the mirror pressing member 50 can be cut easily. As a consequence, since the mirror pressing member 50 can be easily removed from the rotor main body 25, the mirror pressing member can be removed without damaging the polygon mirror 30.

Configuration of Thrust Shaft

In the motor 5 thus configured, a thrust bearing 8 is arranged between the rotor 20 and the stator 40 in a manner that the stator 40 supports the rotor 20 to the thrust direction by using the magnetic force acting between a magnet 81 disposed at the upper end portion of the fixed shaft 44 and a magnet 82 disposed at the upper end portion of the rotor 20 and the magnetic force acting between the stator core 42 and the rotor magnet 22. In other words, the rotor magnet 22 magnetically attracts the stator core 42, and the pair of magnets 81 and 82 respectively fixed on the rotor 20 side and the stator 40 side are opposed in a manner that the opposite polarities are faced to each other, and so the fixed shaft 44 serves to hold the rotor 20 at the predetermined position along the axis direction L of the motor shaft. In this manner, since the thrust bearing 8 is configured by using the magnetic forces acting at these two portions, the rotor can be positioned with a high accuracy along the axial direction L of the motor shaft. Further, since the resonance point along the axis direction L of the motor shaft is high, the motor can be rotated at a high speed more stably.

Configuration of Dynamic Pressure Bearing/Radial Bearing

A radial bearing 7 is configured between the rotor 20 and the stator 40 in a manner that the rotor 40 supports the rotor 20 to the radial direction by using the dynamic pressure generated within a clearance formed between the outer peripheral surface 440 of the fixed shaft 44 and the inner peripheral surface of the rotor 20. The outer peripheral surface of the fixed shaft 44 is subjected to the surface processing in order to improve the abrasion resistance and the burning or baking resistance. Such a surface processing is the coating processing of polyamide-imide resin or the like, on the surface of the polyamide-imide resin coating layer of the fixed shaft 44, dynamic pressure generation grooves 441 such as herringbone or spiral grooves extending counterclockwise (direction shown by an arrow CCW in FIG. 1) when seen from the tip end of the shaft are formed by the cutting process or the like. Thus, when the rotor 20 rotates counterclockwise when seen from the upper direction, only an air flow directed downward is generated in the clearance between the outer peripheral surface 440 of the fixed shaft 44 and the inner peripheral surface of the center hole 21 of the rotor main body 25. As a result, the rotor 20 is slightly lifted by the thrust bearing 8 when the motor 5 is stopped, whilst, when the motor starts rotating, the rotor is slightly sank and held at the magnetically balanced position in the thrust bearing 8. In this state, since the rotor 20 is not in contact with the stator 40, the rotor 20 can be rotated at a high speed. When a dynamic pressure bearing is used as the radial bearing 7, abrasion powder is likely generated at the time of starting or stopping the motor. However, in the embodiment, the dynamic pressure generation grooves 441 are formed so as to direct the air flow downward in order to promote the falling phenomenon of the abrasion powder due to the gravitation. Thus, such abrasion powder is forcedly sent with pressure downward from the space between the fixed shaft 44 and the center hole 21 of the rotor main body 25 and then emitted out of the radial bearing 7. As a result, such a problem can be prevented from occurring that the abrasion powder is piled up between the fixed shaft 44 and the center hole 21 of the rotor main body 25 to cause burning or baking.

Further, in this embodiment, of the outer peripheral surface 440 of the fixed shaft 44 positioned within the center hole 21 of the rotor 20, the lower end side corresponding to the downstream of the air flow is not provided with the dynamic pressure generation grooves 441 at the portion about ¼ thereof. Thus, the rigidity with respect to the dynamic pressure is high at the radial bearing 7 as the dynamic pressure bearing.

Configuration of Air Damper

In the motor 5 thus configured, the fixed shaft 44 is provided with a large diameter portion 446 at the center portion along the axial direction thereof and a small diameter portion 447 at the upper end side of the large diameter portion 446. Thus, a step portion 448 is formed between the large diameter portion 446 and the small diameter portion 447 at the outer peripheral surface 440 of the fixed shaft 44. A boundary portion 449 between the large diameter portion 446 and the small diameter portion 447 is further cut to the inner portion thereof to form a concave portion. Accordingly, even if the rotor 20 shifts downward, the rotor 20 does not contact with the boundary portion 449 between the large diameter portion 446 and the small diameter portion 447. Such a configuration can be formed by processing the outer peripheral surface 440 of the fixed shaft 44 by using the same processing machine, so that the degree of the coaxiality is high at any portion of the fixed shaft 44.

In contrast, the center hole 21 of the rotor 20 is also provided with a large diameter portion 216 at the inner peripheral surface thereof at the center portion along the axial direction thereof. A small diameter portion 217 is formed at the upper end side of the large diameter portion 216. Thus, a step portion 218 is formed between the large diameter portion 216 and the small diameter portion 217 at the inner peripheral surface of the center hole 21 of the rotor 20. A boundary portion 219 between the large diameter portion 216 and the small diameter portion 217 is further cut to the inner portion thereof to form a concave portion. Further, the corner portion 444 of the large diameter portion 216 of the fixed shaft 44 is chamfered. Accordingly, even if the rotor 20 shifts downward, the corner portion 444 of the fixed shaft 44 does not contact with the boundary portion 219 between the large diameter portion 216 and the small diameter portion 217. Such a configuration can be formed by processing the inner peripheral surface of the center hole 21 by using the same processing machine, so that the degree of the coaxiality is high at any portion of the center hole 21.

The diameters of the large diameter portion 216 and the small diameter portion 217 formed at the inner peripheral surface of the center hole 21 of the rotor 20 are formed to be slightly larger by about 20 µm than the diameters of the large diameter portion 446 and the small diameter portion 447 formed at the outer peripheral surface of the fixed shaft 44, respectively. Thus, in the state where the fixed shaft 44 is inserted into the center hole 21 of the rotor 20, an annular clearance 70 for generating dynamic pressure having a size slightly larger than 10 µm is formed at an area where the large diameter portions 446 and 216 overlap along the radial direction of the shaft between the outer peripheral surface of the fixed shaft 44 and the inner peripheral surface of the center hole 21 of the rotor 20. Further, an annular clearance 91 for an air damper having a size of about 10 µm constituting an air damper 9 described later is formed at an area where the small diameter portions 447 and 217 overlap along the radial direction of the shaft between the outer peripheral surface 440 of the fixed shaft 44 and the inner peripheral surface of the center hole 21 of the rotor 20. Furthermore, in the embodiment, the small diameter portion 447 of the outer peripheral surface 440 of the fixed shaft 44 and the large diameter portion 216 of the inner peripheral surface of the center hole 21 of the rotor 20 are partially overlapped along the radial direction of the shaft, and at this portion an annular air chamber 92 for the air damper is formed by a slightly large annular space defined by the step portion 448 of the fixed shaft 44 and the step portion 218 of the center hole 21 of the rotor 20.

Accordingly, in the embodiment, along the axial direction L of the motor shaft between the outer peripheral surface 440 of the fixed shaft 44 and the inner peripheral surface of the center hole 21, the annular clearance 70 for dynamic pressure (dynamic pressure generation portion) for generating dynamic pressure between the outer peripheral surface 440 of the fixed shaft 44 and the inner peripheral surface of the center hole 21 of the rotor 20, the annular air chamber 92 for the air damper which communicates with the annular clearance 70, and the annular clearance 91 for the air damper which communicates the annular air chamber 92 with the external portion are formed in this order. The annular air chamber 92 for the air damper and the annular clearance 91 for the air damper constitute the air damper 9 for the rotor 20.

Action and Effects of the Embodiment

In the motor 5 thus configured, when the rotor 20 rotates counterclockwise when seen from the upper direction, an air flow directed downward is generated in the annular clearance 70 for generating dynamic pressure between the outer peripheral surface 440 of the fixed shaft 44 and the inner peripheral surface of the center hole 21 of the rotor 20, whereby the stator 40 and the rotor 20 are placed in a non-contact state to each other to the radial direction by the dynamic pressure generated by this air flow. Further, although the rotor 20 has been slightly lifted upward during the stop state of the motor 5, when the motor starts rotating, the rotor 20 is slightly sank and held at the magnetically balanced position in the thrust bearing 8. In this state, since the stator 40 and the rotor 20 are placed in a completely non-contact state to each other, the rotor 20 can be rotated at a high speed. Further, since the stator 40 and the rotor 20 are placed in the completely non-contact state to each other, these members can not be worn away at all and so the life time of the motor 5 can be elongated.

Since the rigidity of the thrust bearing 8 utilizing the magnetic force is relatively small, the rotor 20 vibrates vertically due to the external force etc. applied thereto. However, in the air damper 9 formed by the annular air chamber 92 for the air damper and the annular clearance 91 for the air damper in the motor 5 according to the embodiment, even when the motor 5 vibrates vertically due to the disturbance along the axial direction L of the motor shaft applied thereto, the air within the annular air chamber 92 for the air damper is exhausted to the outside through the narrow annular clearance 91 for the air damper, or the air enters from the outside enters into the annular air chamber 92 for the air damper through the narrow annular clearance 91 for the air damper. When the air is exhausted and entered in this manner, friction occurs between the air and the annular clearance 91 for the air damper. As a result, the vibration energy of the rotor 20 to the vertical direction is absorbed by the friction, so that the vibration of the rotor is suppressed.

According to the air damper 9 formed in the motor 5 of this embodiment, the size of the space and the length along the axial direction of the shaft of the motor 5 of the annular clearance 91 for the air damper can be designed freely depending on how the outer peripheral surface 440 of the fixed shaft 44 and the inner peripheral surface of the center hole 21 of the rotor 20 are shaped.

Accordingly, it is possible to constitute the motor 5 containing the air damper 9 therein which can freely set the damping factor of the vibration of the rotor 20 to the vertical direction with a small number of parts and without performing a complicated and troublesome processing.

Other Embodiments

Figure 4:
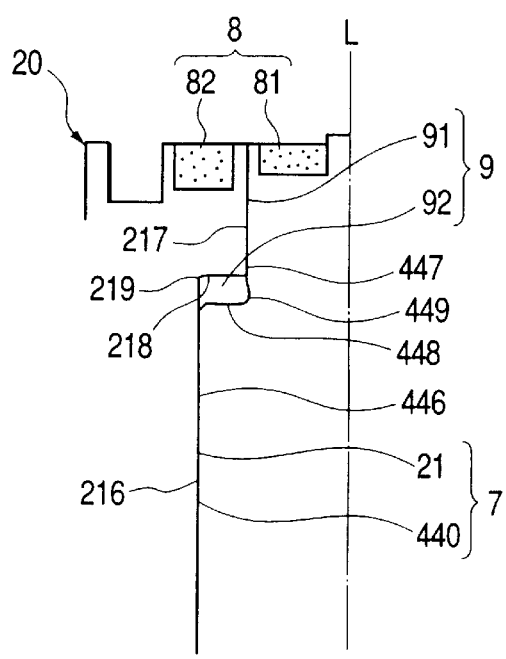
FIG. 4 is a semi-sectional diagram showing the another configuration of the rotor and the fixed shaft used in the polygon mirror driving apparatus shown in FIG. 1.

As shown in FIG. 4, when the annular clearance 91 for the air damper of the air damper 9, which is formed by the small diameter portion 217 formed at the inner peripheral surface of the center hole 21 of the rotor 20 and the small diameter portion 447 formed at the outer peripheral surface 440 of the fixed shaft 44, is formed so as to have a sufficiently long length along the axial direction L of the motor shaft, it is also possible to generate such dynamic pressure for holding the rotor 20 to the radial direction also in the annular clearance 91 for the air damper. Since the remaining configuration of the arrangement of this figure is same as that of the first embodiment, the main portion of this modification common to that of the first embodiment are referred to by the common symbols in FIG. 4. According to the modification thus configured, since the rotor 20 is held by the two dynamic bearings (radial bearings) disposed along the axial direction L of the motor shaft, the rotation efficiency of the rotor 20 can be improved.

The aforesaid embodiment is arranged in a manner that the outer peripheral surface 440 of the fixed shaft 44 and the inner peripheral surface of the center hole 21 are provided with the large diameter portions 446 and 216 for forming the dynamic pressure generation portion and the small diameter portions 447 and 217 for forming the annular clearance 91 for the air damper, respectively. However, in contrast with such a configuration, the invention may be modified in a manner that the outer peripheral surface 440 of the fixed shaft 44 and the inner peripheral surface of the center hole 21 are provided with small diameter portions for forming the dynamic pressure generation portion and large diameter portions for forming the annular clearance for the air damper, respectively. In such a configuration, since a step portion between the small diameter portion and the large diameter portion formed at the outer peripheral surface 440 of the fixed shaft 44 is opposed to a step portion between the small diameter portion and the large diameter portion formed at the inner peripheral surface of the center hole, an annular air chamber for the air damper can also be formed at this opposing portion.

Further, although the embodiment shown in FIG. 2 shows an example where the dynamic pressure generation grooves 441 of the spiral shape are formed at the fixed shaft 44, the present invention is not limited thereto, and dynamic pressure generation grooves of a herringbone shape may be formed at the fixed shaft instead thereof. In such a case, the effect similar to the aforesaid embodiment can be attained.

As described above, according to the motor of the present invention, when the rotor rotates, the stator 40 and the rotor 20 are placed in the non-contact state to each other by the dynamic pressure generated at the dynamic pressure generation portion. Further, when the motor starts rotating, the rotor is held at the magnetically balanced position in the thrust bearing. In this state, since the stator and the rotor are placed in the completely non-contact state to each other, the rotor can be rotated at a high speed and the life time of the motor can be elongated. Since the rigidity of the thrust bearing utilizing the magnetic force is relatively small, the rotor vibrates vertically due to the external force etc. applied thereto. However, in the present invention, when the rotor vibrates vertically due to the disturbance along the axial direction of the motor shaft applied thereto, the exhausting and entering of the air through the narrow annular clearance for the air damper between the external and the annular chamber for the air damper generates the friction of the air. As a result, the vibration energy of the rotor along the vertical direction is absorbed by the friction, so that the vibration of the rotor can be suppressed. Further, according to the damper formed in the motor of this embodiment, the size of the space and the length along the axial direction of the motor shaft of the annular clearance for the air damper can be designed freely depending on how the outer peripheral surface of the fixed shaft and the inner peripheral surface of the center hole of the rotor are shaped. Accordingly, it is possible to constitute the motor having desired damping factor of the vibration of the rotor along the vertical direction.

What is claimed is:

1. A dynamic pressure bearing motor comprising:

a stator having a stator core around which a driving coil is wound and a fixed shaft;

a rotor having a center hole in which said fixed shaft is inserted and a rotor magnet opposing to said stator core;

thrust bearing means, provided at each of said rotor and said stator, for supporting said rotor to thrust direction by magnetic force acting mutually therebetween;

radial bearing means for supporting said rotor to radial direction by dynamic pressure generated between outer peripheral surface of said fixed shaft and inner peripheral surface of said center hole;

a dynamic pressure generation portion defined by said radial bearing means and generates the dynamic pressure between said outer peripheral surface of said fixed shaft and said inner peripheral surface of said center hole;

an annular air chamber for an air damper communicating with said dynamic pressure generation portion;

an annular clearance for communicating said annular air chamber for an air damper with external air; and a large diameter portion for forming said dynamic pressure generation portion and a small diameter portion for forming said annular clearance for the air damper are formed at each of said outer peripheral surface of said fixed shaft and said inner peripheral surface of said center hole, wherein said dynamic pressure generation portion, said annular air chamber for an air damper and said annular clearance for the air damper are disposed in this order along axial direction of said rotor, and wherein further said annular air chamber for an air damper is formed in a manner that a step portion between said large diameter portion and said small diameter portion of said fixed shaft is disposed to be separated from along the axial direction and opposed to a step portion between said large diameter portion and said small diameter portion of said center hole.

2. A dynamic pressure bearing motor comprising:

a stator having a stator core around which a driving coil is wound and a fixed shaft;

a rotor having a center hole in which said fixed shaft is inserted and a rotor magnet opposing to said stator core;

thrust bearing means, provided at each of said rotor and said stator, for supporting said rotor to thrust direction by magnetic force acting mutually therebetween;

radial bearing means for supporting said rotor to radial direction by dynamic pressure generated between outer peripheral surface of said fixed shaft and inner peripheral surface of said center hole;

a dynamic pressure generation portion defined by said radial bearing means and generates the dynamic pressure between said outer peripheral surface of said fixed shaft and said inner peripheral surface of said center hole;

an annular air chamber for an air damper communicating with said dynamic pressure generation portion;

an annular clearance for communicating said annular air chamber for an air damper with external air; and a small diameter portion for forming said dynamic pressure generation portion and a large diameter portion for forming said annular clearance for the air damper are formed at each of said outer peripheral surface of said fixed shaft and said inner peripheral surface of said center hole, wherein said annular air chamber for an air damper is formed in a manner that a step portion between said large diameter portion and said small diameter portion of said fixed shaft is disposed to be separated from along the axial direction and opposed to a step portion between said large diameter portion and said small diameter portion of said center hole, and wherein further said dynamic pressure generation portion, said annular air chamber for an air damper and said annular clearance for the air damper are disposed in this order along axial direction of said rotor.

3. A dynamic pressure bearing motor comprising:

a stator having a stator core around which a driving coil is wound and a fixed shaft;

a rotor having a center hole in which said fixed shaft is inserted and a rotor magnet opposing to said stator core;

thrust bearing means, provided at each of said rotor and said stator, for supporting said rotor to thrust direction by magnetic force acting mutually therebetween;

radial bearing means for supporting said rotor to radial direction by dynamic pressure generated between outer peripheral surface of said fixed shaft and inner peripheral surface of said center hole;

a dynamic pressure generation portion defined by said radial bearing means and generates the dynamic pressure between said outer peripheral surface of said fixed shaft and said inner peripheral surface of said center hole;

an annular air chamber for an air damper communicating with said dynamic pressure generation portion; and an annular clearance for communicating said annular air chamber for an air damper with external air, wherein said dynamic pressure generation portion, said annular air chamber for an air damper and said annular clearance for the air damper are disposed in this order along axial direction of said rotor, and wherein further said annular clearance for the air damper has a length capable of supporting said rotor to the radial direction as said dynamic pressure generation portion for generating the dynamic pressure between said outer peripheral surface of said fixed shaft.

4. A dynamic pressure bearing motor comprising:

a stator having a stator core around which a driving coil is wound and a fixed shaft;

a rotor having a center hole in which said fixed shaft is inserted and a rotor magnet opposing to said stator core;

thrust supporter, provided at each of said rotor and said stator, operable to support said rotor in a thrust direction by a magnetic force acting mutually therebetween;

radial supporter operable to support said rotor in a radial direction by a dynamic pressure generated between an outer peripheral surface of said fixed shaft and an inner peripheral surface of said center hole;

a dynamic pressure generation portion defined by said radial supporter and operable to generate the dynamic pressure between said outer peripheral surface of said fixed shaft and said inner peripheral surface of said center hole;

an annular air chamber communicating with said dynamic pressure generation portion;

an annular clearance for communicating said annular air chamber with external air, and a large diameter portion for forming said dynamic pressure generation portion and a small diameter portion for forming said annular clearance are formed at each of said outer peripheral surface of said fixed shaft and said inner peripheral surface of said center hole, wherein said dynamic pressure generation portion, said annular air chamber and said annular clearance are disposed in this order along an axial direction of said rotor, and wherein further said annular air chamber is formed in a manner that a step portion between said large diameter portion and said small diameter portion of said fixed shaft is separated from along the axial direction and opposed to a step portion between said large diameter portion and said small diameter portion of said center hole.

5. A dynamic pressure bearing motor comprising:

a stator having a stator core around which a driving coil is wound and a fixed shaft;

a rotor having a center hole in which said fixed shaft is inserted and a rotor magnet opposing to said stator core;

thrust supporter, provided at each of said rotor and said stator, operable to support said rotor in a thrust direction by a magnetic force acting mutually therebetween;

radial supporter operable to support said rotor in a radial direction by a dynamic pressure generated between an outer peripheral surface of said fixed shaft and an inner peripheral surface of said center hole;

a dynamic pressure generation portion defined by said radial supporter and operable to generate the dynamic pressure between said outer peripheral surface of said fixed shaft and said inner peripheral surface of said center hole;

an annular air chamber communicating with said dynamic pressure generation portion;

an annular clearance for communicating said annular air chamber with external air, and a small diameter portion for forming said dynamic pressure generation portion and a large diameter portion for forming said annular clearance are formed at each of said outer peripheral surface of said fixed shaft and said inner peripheral surface of said center hole, wherein said annular air chamber is formed in a manner that a step portion between said large diameter portion and said small diameter portion of said fixed shaft is disposed to be separated from along the axial direction and opposed to a step portion between said large diameter portion and said small diameter portion of said center hole, and wherein further said dynamic pressure generation portion, said annular air chamber and said annular clearance are disposed in this order along an axial direction of said rotor.

6. A dynamic pressure bearing motor comprising:

a stator having a stator core around which a driving coil is wound and a fixed shaft;

a rotor having a center hole in which said fixed shaft is inserted and a rotor magnet opposing to said stator core;

thrust supporter, provided at each of said rotor and said stator, operable to support said rotor in a thrust direction by a magnetic force acting mutually therebetween;

radial supporter operable to support said rotor in a radial direction by a dynamic pressure generated between an outer peripheral surface of said fixed shaft and an inner peripheral surface of said center hole;

a dynamic pressure generation portion defined by said radial supporter and operable to generate the dynamic pressure between said outer peripheral surface of said fixed shaft and said inner peripheral surface of said center hole;

an annular air chamber communicating with said dynamic pressure generation portion; and an annular clearance for communicating said annular air chamber with external air, wherein said dynamic pressure generation portion, said annular air chamber and said annular clearance are disposed in this order along an axial direction of said rotor, and wherein further said annular clearance has a length capable of supporting said rotor to the radial direction as said dynamic pressure generation portion for generating the dynamic pressure between said outer peripheral surface of said fixed shaft.

* * * * *